United States Patent
Shim et al.

(10) Patent No.: US 10,211,471 B2
(45) Date of Patent: Feb. 19, 2019

(54) APPARATUS FOR CONTROLLING PURGING IN A HYDROGEN STORAGE SYSTEM AND METHOD FOR THE SAME

(71) Applicants: HYUNDAI MOTOR COMPANY, Seoul (KR); Kia Motors Corporation, Seoul (KR)

(72) Inventors: Ji Hyun Shim, Seoul (KR); Hyung Ki Kim, Seoul (KR); Sang Hyun Kim, Seongnam-si (KR); Chang Ho Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 225 days.

(21) Appl. No.: 14/579,539

(22) Filed: Dec. 22, 2014

(65) Prior Publication Data

US 2015/0188165 A1 Jul. 2, 2015

(30) Foreign Application Priority Data

Dec. 30, 2013 (KR) .................. 10-2013-0166674

(51) Int. Cl.
*H01M 8/04082* (2016.01)
*H01M 8/04791* (2016.01)
*G05D 21/02* (2006.01)
*F17C 11/00* (2006.01)

(52) U.S. Cl.
CPC ....... *H01M 8/04201* (2013.01); *F17C 11/005* (2013.01); *G05D 21/02* (2013.01); *H01M 8/04798* (2013.01); *F17C 2250/032* (2013.01); *F17C 2265/01* (2013.01); *F17C 2270/0168* (2013.01); *Y02E 60/321* (2013.01); *Y10T 137/0419* (2015.04); *Y10T 137/4259* (2015.04)

(58) Field of Classification Search
CPC .......... H01M 8/04201; H01M 8/04798; Y10T 137/0419; Y10T 137/4259; Y02E 60/321; F17C 11/005; F17C 2250/032; F17C 2265/01; F17C 2270/0168; G05D 21/02
See application file for complete search history.

(56) References Cited

U.S. PATENT DOCUMENTS

| | | | | |
|---|---|---|---|---|
| 6,916,563 B2* | 7/2005 | Yamamoto | .......... | H01M 8/0662 429/408 |
| 7,736,814 B2* | 6/2010 | Igarashi | ............ | H01M 8/04007 429/428 |
| 7,855,025 B2* | 12/2010 | Spare | ................ | H01M 8/04097 429/443 |

(Continued)

FOREIGN PATENT DOCUMENTS

| | | |
|---|---|---|
| CN | 1860634 A | 11/2006 |
| CN | 1954449 A | 4/2007 |

(Continued)

*Primary Examiner* — Shogo Sasaki
(74) *Attorney, Agent, or Firm* — Morgan, Lewis & Bockius LLP

(57) ABSTRACT

A method of controlling purging in a hydrogen storage system includes determining the internal hydrogen purity of a hydrogen tank and adjusting a hydrogen purging cycle of the hydrogen tank depending on the determined internal hydrogen purity. An apparatus for controlling purging in a hydrogen storage system is also provided.

8 Claims, 4 Drawing Sheets

(56) References Cited

U.S. PATENT DOCUMENTS

| | | | | |
|---|---|---|---|---|
| 7,943,265 B2* | 5/2011 | Katano | ............ | H01M 8/04097 |
| | | | | 429/428 |
| 7,998,628 B2* | 8/2011 | Kanno | ............ | H01M 8/04231 |
| | | | | 429/412 |
| 8,057,948 B2* | 11/2011 | Takaki | ............ | H01M 8/04089 |
| | | | | 429/428 |
| 8,211,581 B2* | 7/2012 | Katano | ............ | H01M 8/04007 |
| | | | | 429/428 |
| 8,323,841 B2* | 12/2012 | Baaser | ............ | H01M 8/04097 |
| | | | | 429/415 |
| 8,703,349 B2* | 4/2014 | Kanno | ............ | H01M 8/04231 |
| | | | | 429/431 |
| 8,920,984 B2* | 12/2014 | Janarthanam | ....... | B60L 11/1892 |
| | | | | 429/408 |
| 2006/0110640 A1* | 5/2006 | Yoshida | ............ | H01M 8/04097 |
| | | | | 429/429 |
| 2006/0130651 A1* | 6/2006 | Bizjak | ................. | B01D 53/047 |
| | | | | 95/96 |
| 2007/0243437 A1* | 10/2007 | Katano | ............ | H01M 8/04231 |
| | | | | 429/430 |
| 2012/0237843 A1* | 9/2012 | Paganelli | ................. | C25B 1/10 |
| | | | | 429/429 |
| 2013/0137007 A1* | 5/2013 | Lee | ................. | H01M 8/04798 |
| | | | | 429/444 |

FOREIGN PATENT DOCUMENTS

| | | |
|---|---|---|
| CN | 3986285 B2 | 10/2007 |
| CN | 101385176 A | 3/2009 |
| CN | 102097634 A | 6/2011 |
| CN | 102762403 A | 10/2012 |
| CN | 103137987 A | 6/2013 |
| JP | 2000-243417 A | 9/2000 |
| JP | 2003-243020 A | 8/2003 |
| JP | 2003-317752 A | 11/2003 |
| JP | 2004-55287 A | 2/2004 |
| JP | 2004-71307 A | 3/2004 |
| JP | 2004-232777 A | 8/2004 |
| JP | 2004-349215 A | 12/2004 |
| JP | 2005-11674 A | 1/2005 |
| JP | 2005-203143 A | 7/2005 |
| JP | 2005-302422 A | 10/2005 |
| JP | 2005-302648 A | 10/2005 |
| JP | 3882667 B2 | 2/2007 |
| JP | 2008-218106 A | 9/2008 |
| JP | 2009-123612 A | 6/2009 |
| JP | 2010-020910 A | 1/2010 |
| JP | 2010-177111 A | 8/2010 |
| JP | 2012-076713 A | 4/2012 |
| KR | 10-2013-0060741 A | 6/2013 |

* cited by examiner

APPARATUS FOR CONTROLLING PURGING IN A HYDROGEN STORAGE SYSTEM AND METHOD FOR THE SAME

CROSS-REFERENCE TO RELATED APPLICATION

This application claims under 35 U.S.C. § 119(a) the benefit of Korean Patent Application No. 10-2013-0166674 filed on Dec. 30, 2013, the entire contents of which are incorporated herein by reference.

TECHNICAL FIELD

The present inventive concept relates to an apparatus for controlling purging in a hydrogen storage system and a method for the same. In particular, the present inventive concept relates to an apparatus capable of discharging gas including impurities out of a hydrogen storage system by using a purging valve to discharge the impurities remaining therein, and a method for the same.

BACKGROUND

A hydrogen fuel cell vehicle is a vehicle that uses hydrogen as fuel and generates a propulsive force by driving a motor using electric charge generated as the hydrogen reacts with oxygen.

The hydrogen fuel cell vehicle must be equipped with a hydrogen storage system. Recently, according to global trends, 700 bar-high-pressure hydrogen storage systems representing the highest commercialization performance have been installed in a number of vehicles. As air contains components that may be damaging to a fuel cell stack, the air atmosphere in the completed hydrogen storage system must be converted to a hydrogen atmosphere. To replace the air in a tank with hydrogen, a high-pressure charging/discharging process must be repeated over six to eight hours. There is a need for a method of reducing the time or the process required to completely replace the air in a hydrogen storage system with hydrogen.

If another, faster method of ensuring hydrogen purity may be implemented, or if a portion of the existing process of enhancing the hydrogen purity may be omitted, not only can the length of the whole process be reduced, but the manufacturing cost can also be significantly reduced.

SUMMARY OF THE INVENTIVE CONCEPT

Accordingly, the present disclosure has been made in an effort to solve the above-mentioned problems. It is an object of the present disclosure to provide an apparatus capable of effectively controlling hydrogen purging based on hydrogen purity, which improves via a process of repeated hydrogen charging, and a method for the same. It is a further object of the present disclosure to eliminate the need for a previously required additional process to enhance hydrogen purity in order to manage the internal hydrogen purity of the hydrogen storage system at a predetermined level. The present inventive concept further provides a method of controlling purging in a hydrogen storage system. The method includes a) computing internal hydrogen purity of a hydrogen tank and b) adjusting a hydrogen purging cycle of the hydrogen tank depending on the computed internal hydrogen purity.

In step a) of the above method, the internal hydrogen purity of the hydrogen tank can be computed once it has been determined that the hydrogen charging has terminated.

The determination of the hydrogen charging state includes the following steps: 1) detecting whether a fuel door is open, 2) monitoring a tank pressure when the fuel door is open, 3) determining that the hydrogen charging has started if a tank pressure variation, which is the difference in pressure before and after the fuel door is open, is equal to or greater than a reference value, and 4) determining when the hydrogen charging has terminated by detecting when the fuel door has closed.

The internal hydrogen purity of the hydrogen tank is computed as follows (Equation 1):

$$\frac{(A+0.1 \text{ Mpa}) \times X1 + (B-A) \times X2}{(A+0.1 \text{ MPa})} = X_c \quad \text{Equation 1}$$

in which A denotes an internal initial pressure of the hydrogen tank, B denotes a pressure of the hydrogen tank after the hydrogen charging, X1 denotes the hydrogen concentration before the hydrogen charging, X2 denotes the concentration of charged hydrogen, and $X_c$ denotes hydrogen concentration after the hydrogen charging. The hydrogen concentration after the hydrogen charging ($X_c$)) is the value of the internal hydrogen purity of the hydrogen tank. The adjusting of the hydrogen purging cycle of the hydrogen tank depending on the computed hydrogen purity [step b) of the method disclosed above] may further comprise the following steps: 1) comparing the value of the computed internal hydrogen purity with a reference value, and 2) setting the hydrogen purging cycle such that hydrogen purging is less frequently performed when the value of the computed hydrogen purity is equal to or greater than the reference value than when the value of the computed hydrogen purity is less than the reference value.

A purging valve for the hydrogen purging may be open for a period of time if a quantity of generated electric charges reaches a reference electric charge quantity, and the reference electric charge quantities are set to mutually-different different values when the value of the hydrogen purity is less than the reference value and when the value of the hydrogen purity is equal to or greater than the reference value, respectively, while an opening time of the purging valve is set to an equal time in each case.

In addition, the reference electric charge quantity may be set to a first reference electric charge quantity if the value of the hydrogen purity is less than the reference value, and set to a second reference electric charge quantity if the value of the hydrogen purity is equal to or greater than the reference value, with the second reference electric charge quantity set to a value greater than a value of the first reference electric charge quantity. The opening time of the purging valve may be set to a value selected in a range of 0.1 second to 1.0 second.

Further, in the adjusting of the hydrogen purging cycle of the hydrogen tank depending on the computed hydrogen purity, the hydrogen purging cycle may be determined from a purging cycle map including data mapped with the internal hydrogen purity and the hydrogen purging cycle of the hydrogen tank.

In addition, the purging cycle map may be set by shortening the purging cycle as the hydrogen purity decreases.

In addition, the purging cycle map may be set by lengthening the opening time as the hydrogen purity decreases.

In accordance with another aspect of the present inventive concept, there is provided an apparatus for controlling purging in a hydrogen storage system. The apparatus includes a hydrogen tank, a purging valve for hydrogen purging in the hydrogen tank, and a controller to adjust a hydrogen purging cycle. The controller calculates internal hydrogen purity of the hydrogen tank and adjusts a purging cycle of the hydrogen tank based on the computed internal hydrogen purity.

In addition, a pressure sensor may be further provided to measure an internal pressure of the hydrogen tank. The controller may determine the internal hydrogen purity of the hydrogen tank based on Equation 1 using pressure values before and after hydrogen charging, which may be received from the pressure sensor, $$\frac{(A + 0.1 \text{ MPa}) \times X1 + (B - A) \times X2}{(A + 0.1 \text{ MPa})} = X_c \quad \text{Equation 1}$$

in which A denotes an internal initial pressure of the hydrogen tank, B denotes a pressure of the hydrogen tank after the hydrogen charging, X1 denotes the hydrogen concentration before the hydrogen charging, X2 denotes the concentration of charged hydrogen, and $X_c$ denotes the hydrogen concentration after the hydrogen charging, respectively. The hydrogen concentration after the hydrogen charging ($X_c$)) is the value of the internal hydrogen purity of the hydrogen tank.

In addition, a fuel door sensor may be further provided to detect an open/closed state of a fuel door. The controller may monitor a tank pressure if the open state of the fuel door is detected, determine hydrogen charging as starting if a tank pressure variation, which occurs before and after the fuel door is open, is a value equal to or greater than a reference value, and determine the hydrogen charging as terminating if the fuel door is closed.

In addition, the controller may compare a reference value for the hydrogen purity with a value of the computed internal hydrogen purity and adjust the purging cycle such that hydrogen purging is more frequently performed when the value of the computed hydrogen purity is less than the reference value as compared to when the value of the computed hydrogen purity is equal to or greater than the reference value.

Further, the controller may control the purging valve to be opened for a period of time if a quantity of electric charge generated in a stack reaches a reference electric charge quantity, and reference electric charge quantities may be set to mutually-different values when the value of the computed hydrogen purity is less than the reference and when the value of the computed hydrogen purity is equal to or greater than the reference value, respectively, while an opening time of the purging valve may be set to an equal time in each case.

In addition, the reference electric charge quantity may be set to a first reference electric charge quantity if the value of the hydrogen purity is less than the reference value, and set to a second reference electric charge quantity if the value of the hydrogen purity is equal to or great than the reference value, with the second reference electric charge quantity set to a value greater than a value of the first reference electric charge quantity, and the opening time of the purging valve is set to a value selected in a range of 0.1 second to 1.0 second.

In addition, the controller may include a purging cycle map including data mapped with the internal hydrogen purity and the purging cycle of the hydrogen tank, and may determine the purging cycle based on the purging cycle map.

In addition, the purging cycle map may be set by shortening the purging cycle as the hydrogen purity decreases.

Alternatively, the purging cycle map may be set by lengthening the opening time as the hydrogen purity decreases.

As described above, in the apparatus for controlling the purging in the hydrogen storage system and the method for the same according to the present inventive concept, the purging cycle is computed based on the internal hydrogen purity of the hydrogen storage system, so that the purging timing can be determined, thereby realizing optimal hydrogen purging.

In addition, according to a conventional scheme of determining the purging timing by using consumption current, a process of enhancing hydrogen purity requiring long time and high cost must be performed in the manufacturing process of a tank system or the initial operating process of the tank system. However, according to the present inventive concept, the process of enhancing the hydrogen purity can be omitted, so that the production cost of the hydrogen storage system can be reduced, and the time required to manufacture the hydrogen storage system can be reduced.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present inventive concept, and wherein.

Figure 1:
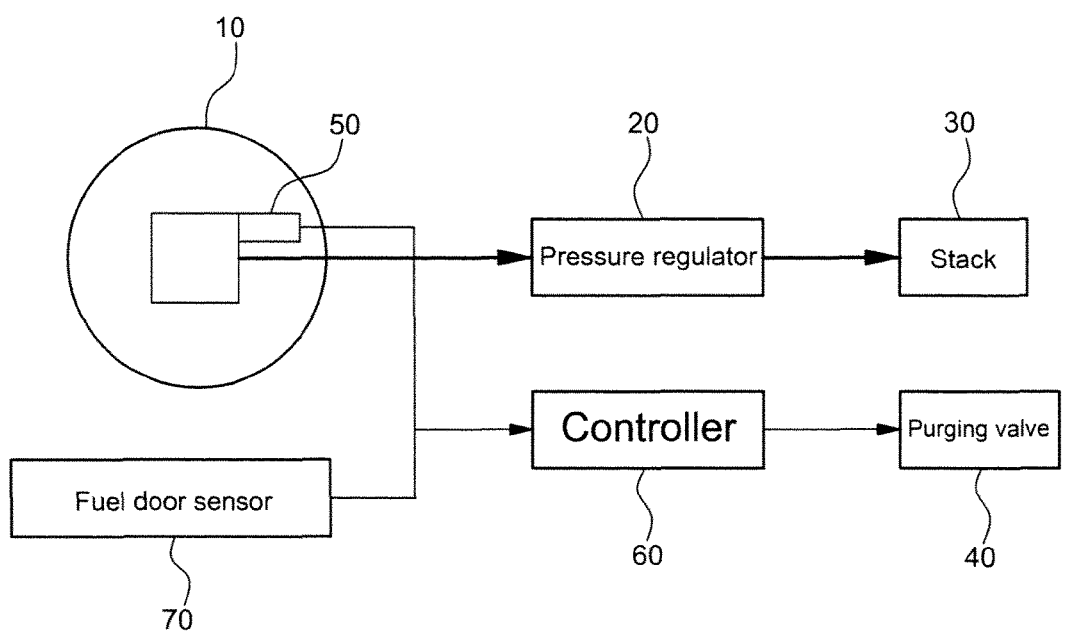
FIG. 1 is a schematic view showing an apparatus for controlling purging in a hydrogen storage system according to an exemplary embodiment of the present inventive concept.

It should be understood that the appended drawings are not necessarily to scale, presenting a somewhat simplified representation of various preferred features illustrative of the basic principles of the inventive concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present inventive concept throughout the several figures of the drawing.

DETAILED DESCRIPTION

The internal hydrogen purity of a hydrogen storage system converges to the purity of injected hydrogen as hydrogen is repeatedly filled, and the hydrogen purity is determined depending on an amount of filled hydrogen.

Since hydrogen purging is the process of discharging impurities remaining in a hydrogen tank, a hydrogen purging cycle can be adjusted by using the internal hydrogen purity of the hydrogen tank.

Therefore, the present disclosure provides an apparatus for controlling purging in the hydrogen storage system and a method for the same, in which the internal hydrogen purity of the hydrogen storage system is measured, and the hydrogen purging is variably controlled depending on the measured internal hydrogen purity, thereby realizing the optimal purging timing.

Hereinafter, an apparatus for controlling purging in a hydrogen storage system and a method for the same according to one exemplary embodiment of the present inventive concept will be described in detail with reference to accompanying drawings.

FIG. 1 is a schematic view showing an apparatus for controlling purging in a hydrogen storage system according to an exemplary embodiment of the present inventive concept.

According to the embodiment shown in FIG. 1, the apparatus for controlling purging in the hydrogen storage system includes a controller 60 to control a purging cycle and a fuel door sensor 70 to detect the open/closed state of a fuel door, in addition to other components of the hydrogen storage system, such as a hydrogen tank 10, a pressure sensor 50, a pressure regulator 20, a fuel cell stack 30, and a purging valve 40.

The pressure sensor 50 checks the pressure of hydrogen stored in the hydrogen tank 10, and the pressure regulator 20 reduces the pressure of the hydrogen from a high pressure to a low pressure and feeds the hydrogen into the fuel cell stack 30.

According to the embodiment, the apparatus for controlling purging in the hydrogen storage system includes the purging valve 40 for hydrogen purging in the hydrogen tank 10 and the controller 60 for adjusting a hydrogen purging cycle.

In this case, the controller 60 is configured to compute the internal hydrogen purity of the hydrogen tank 10 and adjust the purging cycle in the hydrogen tank 10 based on the computed hydrogen purity.

Adjusting the purging cycle may include various operations such as changing the purging frequency as well as adjusting the amount of time the purging valve is open in each cycle, which determines the amount of gas purged in each cycle.

Therefore, those skilled in the art should comprehend that the apparatus for controlling the purging in the hydrogen storage system and the method for the same according to the present inventive concept includes various embodiments to adjust the purging cycle, which may include, but is not limited to, adjusting of the purging frequency and adjusting the amount of time the purging valve is open during each purging cycle.

In addition, the fuel door sensor 70 transmits information on the open/closed state of the fuel door to the controller 60, and the controller 60 determines charging termination based on the information about the open/closed state of the fuel door and the variation in the internal pressure of the hydrogen tank 10.

Accordingly, the controller 60 determines present hydrogen purity based on a) the information about pressure variation occurring before and after hydrogen charging and b) the information about hydrogen concentration before the hydrogen charging.

The controller 60 then controls the purging cycle of the purging valve 40 based on the computed hydrogen purity.

The determination of the hydrogen purity and the purging control will be described in detail when describing the method for controlling the purging in the hydrogen storage system below.

Figure 2:
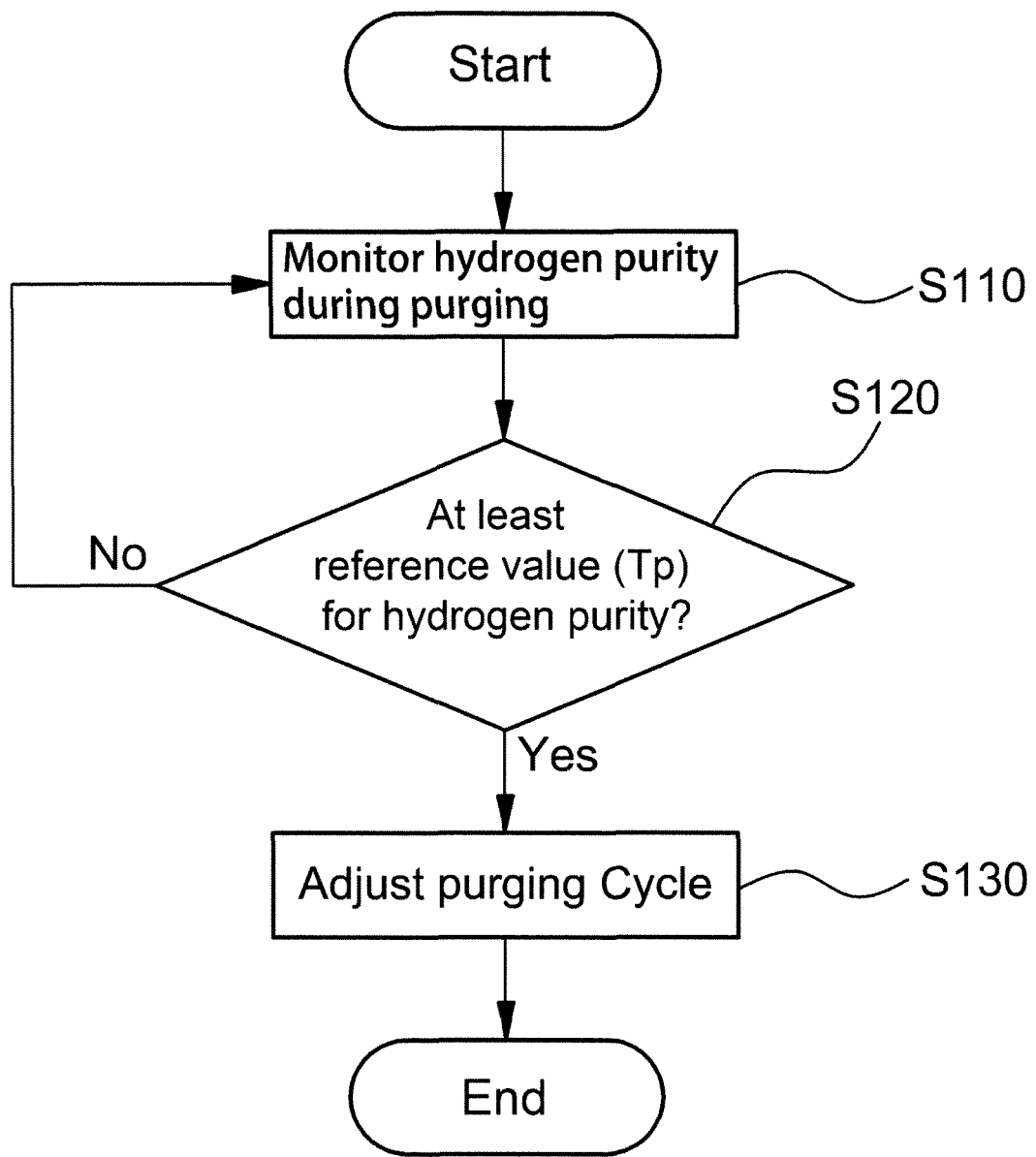
FIG. 2 is a flowchart schematically showing a method for controlling purging in a hydrogen storage system according to an exemplary embodiment of the present inventive concept.

FIG. 2 is a flowchart schematically showing the method for controlling the purging in the hydrogen storage system according to the exemplary embodiment of the present inventive concept.

As shown in FIG. 2, the method for controlling the purging in the hydrogen storage system according to an exemplary embodiment of the present inventive concept comprises monitoring hydrogen purity (S110) and adjusting the purging cycle based on the hydrogen purity that is calculated (S130).

In an embodiment, the monitored hydrogen purity value is compared with a reference value ($T_p$) for the hydrogen purity (S120).

There may be two hydrogen purity ranges divided based on the reference value. The two hydrogen purity ranges may have mutually-different hydrogen purging cycles Therefore, according to the present embodiment, the hydrogen purging cycle is adjusted (S130) based on the comparison of the monitored hydrogen purity value and the reference value. FIG. 2 shows an embodiment wherein, at the start of the process, the hydrogen tank has an internal hydrogen purity lower than the reference value for the hydrogen purity. After comparison with the reference value for the hydrogen purity (S120), if the monitored hydrogen purity value is equal to or greater than the reference value for the hydrogen purity (Yes), a purging control reference state is determined as being changed, so that the hydrogen purging frequency is adjusted.

However, according to the comparison with the reference value for the hydrogen purity (S120), if the monitored hydrogen purity value is less than the reference value for the hydrogen purity, since the same state is maintained, it is unnecessary to adjust the hydrogen purging frequency. Accordingly, the process returns to the monitoring of the hydrogen purity (S110).

In another embodiment (not shown), the hydrogen tank has, at the start of the process, an internal hydrogen purity greater than the reference value for the hydrogen purity. In this case, the purging frequency is adjusted only if the monitored hydrogen purity value is less than the reference value for the hydrogen purity, and the purging frequency is maintained if the monitored hydrogen purity value is equal to or greater than the reference value for the hydrogen purity.

The hydrogen purity may be calculated using Equation 1 in the monitoring of the hydrogen purity (S110) of FIG. 2.

$$\frac{(A + 0.1 \text{ MPa}) \times X1 + (B - A) \times X2}{(A + 0.1 \text{ MPa})} \qquad \text{Equation 1}$$

in which A denotes an internal initial pressure of the hydrogen tank, B denotes the pressure of the hydrogen tank after hydrogen charging, X1 denotes the hydrogen concentration before the hydrogen charging, X2 denotes the concentration of charged hydrogen, and $X_c$ denotes the hydrogen concentration after the hydrogen charging.

The hydrogen concentration ($X_c$) after the hydrogen charging, which is calculated in Equation 1, becomes an internal hydrogen purity value of the hydrogen tank.

Therefore, in the method for controlling the purging in the hydrogen storage system according to the present embodiment, pressures A and B before and after the hydrogen charging are measured, and the internal hydrogen purity value of the hydrogen tank is calculated based on the values of the measured pressures before and after the hydrogen charging, as well as the internal hydrogen concentration of the hydrogen tank before hydrogen charging (X1) and charged-hydrogen concentration (X2).

Meanwhile, the variation in the hydrogen purity occurs when hydrogen is charged, and the measuring of the pressures before and after the hydrogen charging is required in order to compute the hydrogen purity. Therefore, according to an exemplary embodiment of the present inventive concept, the determining of a charging state of hydrogen into the hydrogen storage system is further included.

Figure 3:
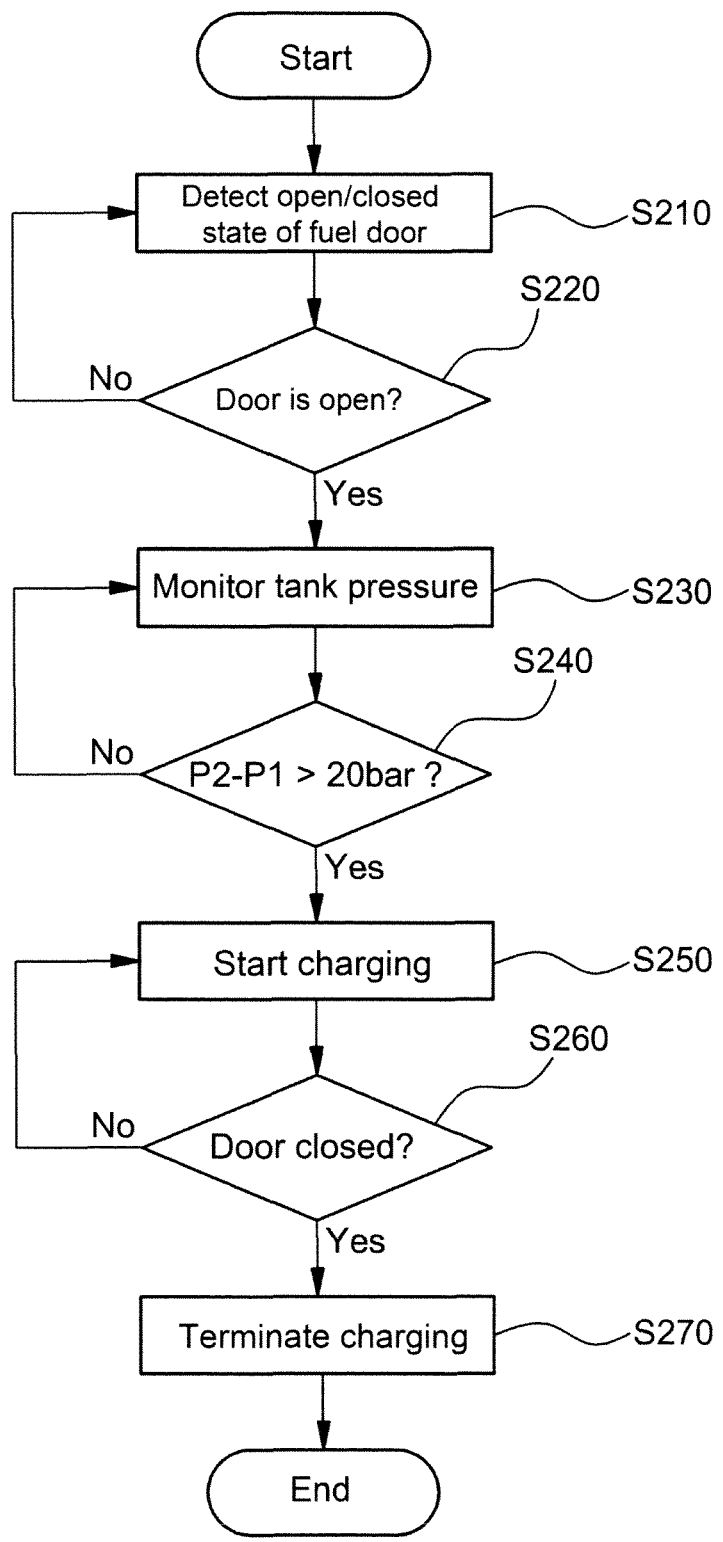
FIG. 3 is a flowchart showing a process of determining charging termination when computing hydrogen purity according to the present inventive concept.

The charging state of the hydrogen into the hydrogen storage system may be determined based on the open/closed state of the fuel door as shown in FIG. 3.

In detail, the determining of the charging state of the hydrogen into the hydrogen storage system includes sensing an open/closed state of the fuel door (S210), determining the open state of the fuel door (S220), and monitoring a tank pressure (S230). In this case, the monitoring of the tank pressure is performed to exclude the case that hydrogen is not charged after the fuel door has been open. Accordingly, if the monitored tank pressure represents a value greater than a reference value, the hydrogen charging is determined as being started (S240 and S250). If the hydrogen charging is stopped, and the fuel door is closed, the hydrogen charging is determined as being completely terminated (S260 and S270).

If the hydrogen charging is determined as having completely terminated, the controller, which controls control the opening and the closing of the purging valve, receives internal pressure values of the hydrogen tank before and after the hydrogen charging to calculate the internal hydrogen purity of the hydrogen storage system through the above processes.

According to an embodiment, the hydrogen purity value obtained through the above process is compared with the reference value for the hydrogen purity, and the hydrogen purging cycle is controlled according to the comparison result. For example, in certain embodiments, the frequency of the hydrogen purging cycles may be controlled according to the comparison result. In certain embodiments, the opening time of the purging valve during a hydrogen purging cycle may be controlled as well.

The hydrogen purging cycle may be controlled by taking into consideration the hydrogen purity in such a manner that the hydrogen purging is less frequently performed when the previously calculated hydrogen purity value is greater than or equal to the reference value than when the hydrogen purity value is less than the reference value.

The purging cycle may additionally or alternatively be controlled based on the quantity of electric charge generated from the fuel cell stack 30. The purging cycle may be set in such a manner that the purging valve is open for a set opening time if the quantity of the generated electric charge reaches a reference electric charge quantity.

Particularly, in the method for controlling the purging in the hydrogen storage system according to the present inventive concept, the hydrogen purging must be performed for mutually-different cycle times set when the calculated hydrogen purity value is less than the reference value and when the calculated hydrogen purity value is equal to or greater than the reference value, respectively.

To this end, preferably, reference electric charge quantities are set to mutually-different values when the hydrogen purity value is less than the reference value, and when the hydrogen purity value is equal to or greater than the reference value, respectively, while the opening time of the purging valve is set to an equal time in each case.

The reference electric charge quantity may be set to a first reference electric charge quantity if the hydrogen purity value is less than the reference value, and may be set to a second reference electric charge quantity if the hydrogen purity value is equal to or greater than the reference value. The first and the second reference electric charge quantities is set to different values from each other. If the reference electric charge quantities are set to mutually-different values as described above with respect to the two cases, the opening time of the purging valve may be selected in the range of 0.1 seconds to 1.0 second, and may be set to the same time in each case.

Accordingly, if the hydrogen purity is less than the reference value, the purging valve is open for the opening time of the purging valve whenever the quantity of electric charges generated in the fuel cell stack reaches the first reference electric charge quantity. If the hydrogen purity is equal to or greater than the reference value, the purging valve is open for the opening time of the purging valve whenever the quantity of electric charges generated in the fuel cell stack reaches the second reference electric charge quantity. In this case, the second reference electric charge quantity must be set to a value greater than the first reference electric charge quantity.

As described above, there may be provided another embodiment in which the opening time of the purging valve may be set to various values in order to control the purging cycle.

Figure 4:
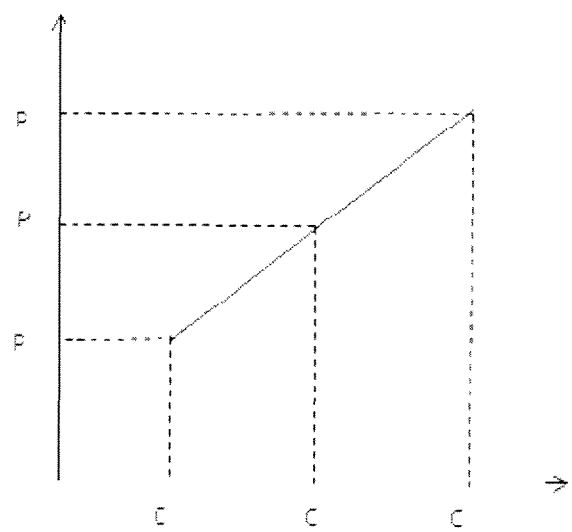
FIG. 4 is a conceptual map showing the relationship between the length of the purging period and the hydrogen purity of the hydrogen tank.

Meanwhile, according to still another embodiment of the present inventive concept, the purging cycle may be controlled through a purging cycle map for the control of the purging cycle. The purging cycle map is stored inside the control ROM, which determines the purging period using a mapped value based on the computed hydrogen purity As illustrated in FIG. 4, as the length of purging period is decreased, the hydrogen purity decreases. If the purging period were to be increased, the hydrogen purity would increase.

The purging cycle map may be set in such a manner that the purging cycle is shortened or the opening time of the purging valve is lengthened as the hydrogen purity is decreased.

Accordingly, the purging cycle map may include various reference electric charge values and various opening times of the purging valve.

As described above, in the apparatus for controlling the purging in the hydrogen storage system and the method for the same according to the present inventive concept, the hydrogen purity can be monitored and the purging cycle of the purging valve can be controlled based on the monitored hydrogen purity value. Accordingly, since it is unnecessary to maintain the hydrogen purity at a predetermined level, a process of enhancing the hydrogen purity may be omitted in a situation, such as the manufacturing of the hydrogen tank or the initial operating of the hydrogen tank.

Although the present inventive concept has been described in detail hereinabove, the scope of the present inventive concept is not limited to the description. Various modifications made by those skilled in the art using the present basic inventive concept defined by the claims also fall within the scope of the present inventive concept.

What is claimed is:

1. A method of controlling purging in a hydrogen storage system in a vehicle, the method comprising:

determining, by a sensor, whether hydrogen charging in which hydrogen is supplied into a hydrogen tank is started;

computing, by a controller, internal hydrogen purity of the hydrogen tank in response to determining that the hydrogen charging is terminated; and adjusting, by the controller, a hydrogen purging cycle by a purging valve depending on the computed internal hydrogen purity, wherein, in the computing of the internal hydrogen purity of the hydrogen tank, the internal hydrogen purity of the hydrogen tank after the hydrogen charging is calculated by using an initial internal pressure of the hydrogen tank before the hydrogen charging, an internal pressure of the hydrogen tank after the hydrogen charging, a hydrogen concentration before the hydrogen charging and a hydrogen concentration of charged hydrogen during the hydrogen charging, wherein the adjusting of the hydrogen purging cycle by the purging valve depending on the computed internal hydrogen purity comprises:

comparing, by the controller, the computed internal hydrogen purity with a reference value of internal hydrogen purity, determining, by the controller, the hydrogen purging cycle by setting a reference electric charge quantity based on the computed internal hydrogen purity, and performing hydrogen purging, by opening the purging valve, in response to determining, by the controller, a quantity of electric charge generated in a fuel cell stack reaches the reference electric charge quantity, wherein the reference electric charge quantity is set to a first reference electric charge quantity in response to determining that the value of the computed internal hydrogen purity is less than the reference value of internal hydrogen purity, and set to a second reference electric charge quantity in response to determining that the value of the computed internal hydrogen purity is equal to or greater than the reference value of internal hydrogen purity, and wherein the first and the second reference electric charge quantities are set to different values from each other.

2. The method of claim 1, wherein the determining whether hydrogen is supplied into the hydrogen tank comprises:

detecting whether a fuel door of the vehicle is open;

monitoring the internal pressure of the hydrogen tank when the fuel door is open; and determining whether the supply of hydrogen has started in response to determining that a tank pressure variation, which is the difference in pressure before and after the fuel door is open, is equal to or greater than a reference value;

wherein the method further comprises:

determining the termination of the supply of hydrogen in response to detecting that the fuel door has closed.

3. The method of claim 1, wherein an opening time of the purging valve is uniformly set.

4. The method of claim 3, wherein the second reference electric charge quantity is at a value greater than a value of the first reference electric charge quantity, and the opening time of the purging valve is at a value selected in a range of 0.1 second to 1.0 second.

5. The method of one of claim 1, wherein the adjusting of the hydrogen purging cycle of the hydrogen tank depending on the computed hydrogen purity comprises determining the hydrogen purging cycle from a purging cycle map including data mapped with the internal hydrogen purity and the hydrogen purging cycle of the hydrogen tank.

6. The method of claim 5, wherein the purging cycle map is set by shortening the purging cycle as the hydrogen purity decreases.

7. The method of claim 5, wherein the purging cycle map is set by lengthening the opening time as the hydrogen purity decreases.

8. The method of claim 1, wherein an opening time of the purging valve is set to various values so as to control the hydrogen purging cycle.

* * * * *